Nov. 30, 1965    R. N. LAHDE    3,220,501
GROUND EFFECT MACHINES
Filed Nov. 9, 1962    3 Sheets-Sheet 1

INVENTOR.
REINHARD N. LAHDE
BY
*George C. Sullivan*
Agent

Nov. 30, 1965 R. N. LAHDE 3,220,501
GROUND EFFECT MACHINES
Filed Nov. 9, 1962 3 Sheets-Sheet 2

INVENTOR.
REINHARD N. LAHDE
BY
Agent

INVENTOR.
REINHARD N. LAHDE
BY
Agent

United States Patent Office 3,220,501
Patented Nov. 30, 1965

3,220,501
GROUND EFFECT MACHINES
Reinhard N. Lahde, Tarzana, Calif., assignor to Lockheed
Aircraft Corporation, Burbank, Calif.
Filed Nov. 9, 1962, Ser. No. 236,511
2 Claims. (Cl. 180—7)

This invention relates to ground effect machines or to machines which are supported above a base plane by means of an air cushion.

The principle of supporting a vehicle over a base plane, whether water or ground, by injecting pressurized air into a plenum chamber is well known. One of the problems with this type of vehicle is to minimize the amount of power which is lost when the air escapes around the periphery of the plenum chamber. The higher these vehicles hover over the base plane, the greater is the loss of air from the chamber. This lost air must be replenished by the fans or blowers if the vehicle is to be continuously supported at the desired height above the base plane.

Accordingly, it is a general object of the present invention to provide a ground effect machine in which the amount of pressurized air lost to the atmosphere is minimized, and therefore the power requirements for the vehicle are also reduced. In accordance with one embodiment of the present invention, this object is achieved by use of a plenum chamber which generally maintains contact with the base plane and thereby reduces the escape area for the air.

Since contact of the plenum chamber with the base plane will produce drag or friction loss during forward motion of the vehicle, another object of the present invention is to minimize this loss by providing a plenum chamber with unique walls. In accordance with one embodiment of the present invention, the plenum chamber is of generally rectangular configuration and utilizes flaps for the aft and fore transverse walls. These flaps are pivoted or hinged so that they will readily yield to obstacles that they might encounter in the base plane. These flaps may also be pressure balanced or provided with springs to maintain light contact of the flaps with the base plane. The longitudinal or side walls are constituted of a rigid portion and an endless belt which extends below the rigid portion and contacts the base plane. The belt is driven at substantially the same speed as the vehicle so that there is little or no relative movement of the belt with respect to the base plane. In this manner, the friction between the plenum chamber walls and the base plane is kept to a minimum.

Another object of the invention is to provide vehicle stability and directional control. This object may be accomplished in one of several ways in accordance with the present invention. In one embodiment, it may be accomplished by sub-dividing the plenum chamber into compartments. Then, by providing for a variation in air pressure in each of these compartments, pitch and roll stability may be obtained. Directional control in this embodiment may be achieved by an aerodynamic rudder. In other embodiments, directional control and stability may be achieved by a system of hydrofoils or by aerodynamic control surfaces, or by a combination of these methods.

These objectives and other features of the present invention will be better understood by reference to the following detailed description when taken in conjunction with the accompanying drawings in which.

Figures 1, 2:
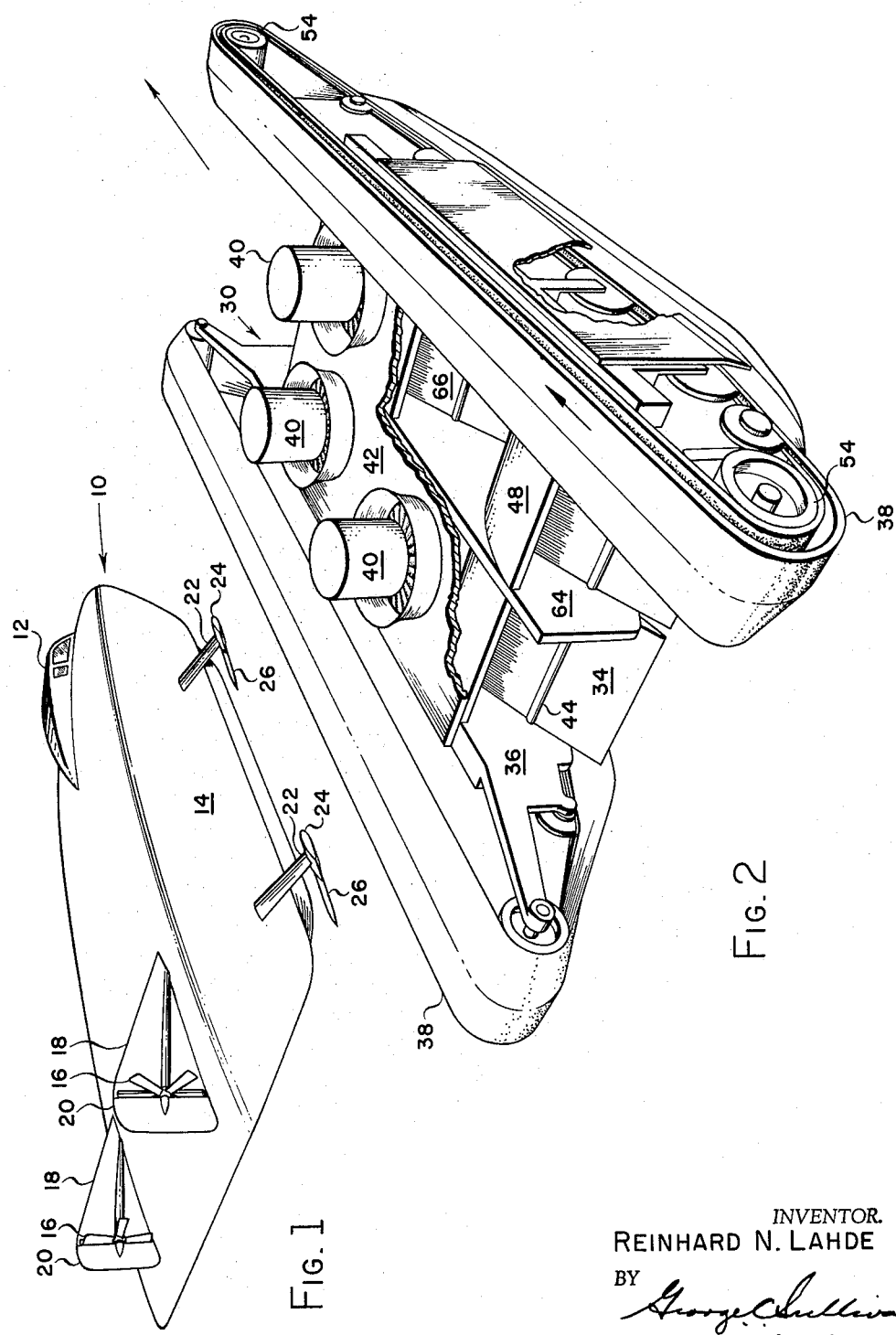
FIGURE 1 is a perspective view showing one embodiment of the present invention.
FIGURE 2 is also a perspective view of the above embodiment with the superstructure and streamlining removed to show pertinent internal structure.

FIGURE 1 shows a ground effect machine, generally designated as 10, which is adapted for over water travel. Vehicle 10 has a control compartment, or bridge, 12, streamlining skin 14, and propulsion means which consist of a pair of air propellers 16 suitably mounted on fins 18 at the rear of the vehicle. Adjacent to propellers 16 is a pair of aerodynamic rudders 20 which provide directional control.

Also shown in FIGURE 1 are struts 22 to which are mounted servo-mechanism units 24 and hydrofoils 26 actuated by the servo-mechanism units. A pair of these hydrofoils are mounted on each side of the vehicle 10 to provide pitch and roll stabilization. These control and stabilization means may be used in lieu of or in combination with other means to be described more specifically hereinafter.

Figure 3:
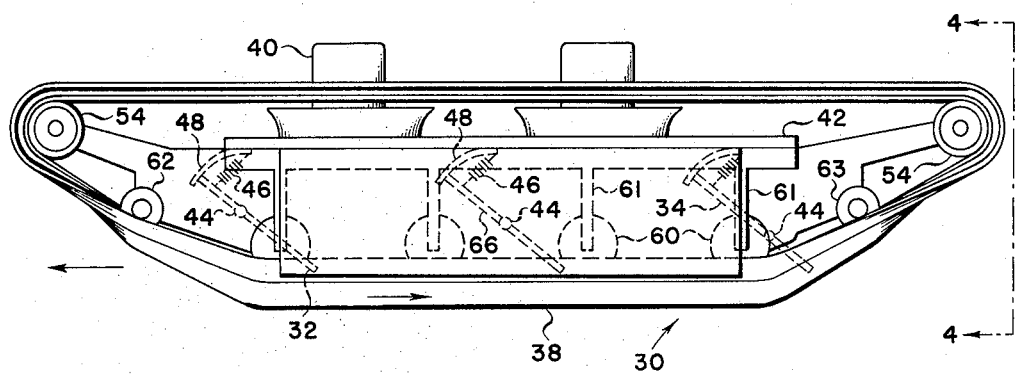
FIGURE 3 is a side elevational view of the internal structure shown in FIGURE 2.
Figure 4:
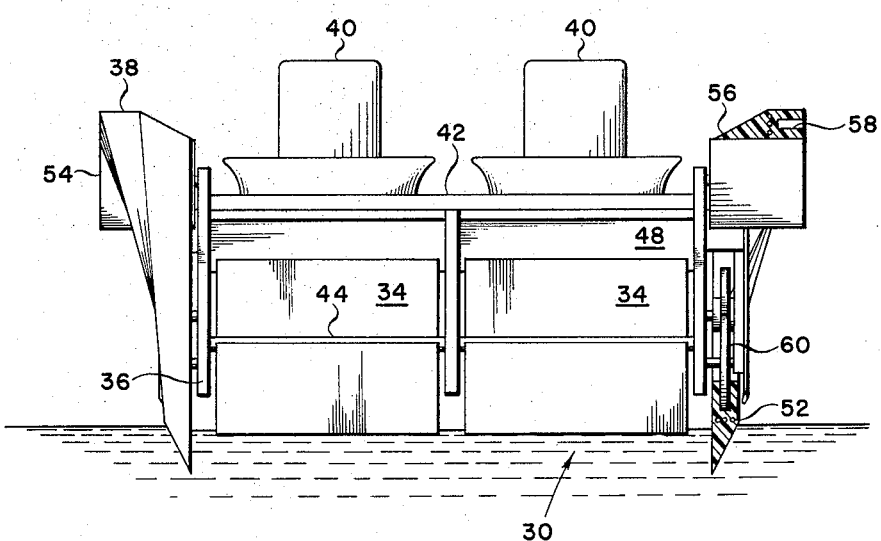
FIGURE 4 is an end elevational view, partly in section, of the structure shown in FIGURE 2.

The plenum chamber, generally designated as 30, and its attendant structure is better shown in FIGURES 2 to 4. Chamber 30 is generally rectangular and is comprised of flaps 32, 34, which respectively define the transverse fore and aft walls of the chamber, and of longitudinal or side walls 36. Although flaps 32, 34 are shown in the figures as being divided for a purpose to be described hereinafter, they can also be single, integral members. Closely adjacent to the side walls 36 is a pair of endless belts 38, a portion of which protrudes below wall 36 and extends into the water (FIGURE 4). Pressurized air for plenum chamber 30 is supplied by air blowers 40 suitably mounted on a platform 42 comprising the ceiling of chamber 30. As previously mentioned, the air pressure in the chamber is controlled so that the flaps 32, 34 and belts 38 generally maintain contact with the water, thereby keeping the amount of air which is lost at the periphery of chamber 30 to a minimum.

Flaps 32 and 34 are hinged about axis 44 so that they will readily yield to obstacles that they might encounter in the water. Axis 44 is so located that there is a balancing of pressure loads on the two portions of the flap separated by the axis. In the case of the fore flaps 32, there will be a slightly greater pressure load on the lower portion of the flap so that the flap will be biased to maintain light contact with the water. In the case of the aft flap 34, there will be a slightly greater pressure load on the upper portion of the flap for the same reason. The balancing of pressure loads is to overcome any tendency of the fore flaps 32 to dig or submerge into the water and to overcome any tendency of the aft flaps 34 to lift away from the water. Overhead baffles 48 help to prevent air leakage during movement of the flaps. Springs 46 may also be used in lieu of the abovementioned pressure load balancing.

Figures 5, 6:
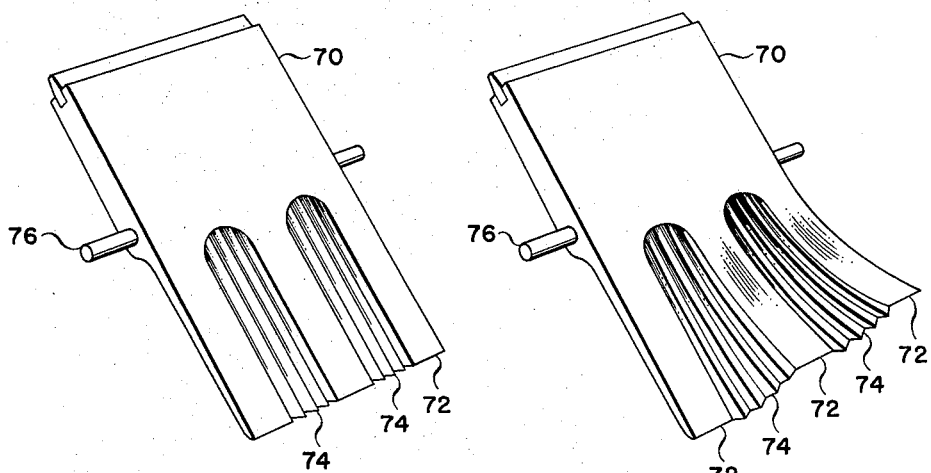
FIGURE 5 shows a perspective view of a segmented flap which can be used as one of the transverse walls in the plenum chamber in the above embodiment.
FIGURE 6 is another perspective view of the flap of FIGURE 5, showing differential deflection of a segment.

A segmented flap 70 shown in FIGURES 5 and 6 may also be substituted for flaps 32 and 34. Flap 70 has segments 72 separated by an elastic membrane 74. This segmented construction allows the flap to respond locally to disturbances such as waves, which may not be large enough to disturb the entire flap. By confining flap movement to localized areas, the air sealing action of the flap is greatly enhanced. Flap 70 is also mounted on pivots 76, which are located to achieve the proper balancing of pressure loads on the flap.

Endless belt 38, which is mounted adjacent to side walls 36, is comprised of an elastomeric material and reinforced with steel cables 52. The belt is driven by end pulleys 54 attached to a suitable driving means, such as an electrical motor (not shown). One side of the belt is beveled to form a wedge-shaped tip 56, as shown in FIGURE 4. The belt may also be beveled symmetrically to form a V tip, the object of the tip being to minimize wave drag. The side opposite the tip is provided with a groove or channel 58 into which idler pulleys 60 fit. Pulleys 60 depend from suitable mounts 61 and orient belt 38 so that the tip 56 will be in contact with the water. Fore guide pulleys 62 disposed between the idler pulleys 60 and the fore drive pulleys 54 provide for smooth transition of the belt from a horizontal position to a vertical or tip down position. Guide pulleys 63 likewise help in the transition of the belt from the vertical to the horizontal position. By driving the belt so that the tip down portion is moving at a speed substantially equal to that of the vehicle but in an opposite direction, it will be apparent that there will be little or no relative motion of that portion of the belt with respect to the water. Consequently, the drag or friction loss will be at a minimum.

In modifying the above embodiment for travel over land, belt 38 may be configured to have a flat surface rather than a tip to serve better as a bearing surface.

Besides the pitch and roll stabilization achieved by hydrofoils as previously described, another method for obtaining such stabilization is shown in FIGURES 2 to 4. This method consists of dividing the plenum chamber into four separate compartments by providing for a central longitudinal wall 64 and additional transverse flaps 66. By differential pressurization of the separate compartments, it will be apparent that the vehicle can be stabilized with respect to the pitch and roll axes. In fact, with this configuration, the vehicle is self-stabilizing to a certain extent. For example, if one of the compartments should be lifted higher above the water, then its escape area for the air will be greater, and a greater amount of air will escape. This loss of air will cause a pressure drop in that compartment, and the compartment will settle accordingly until the escape area is reduced and the pressure therein is more nearly like the pressure in the other compartments.

Figure 7:
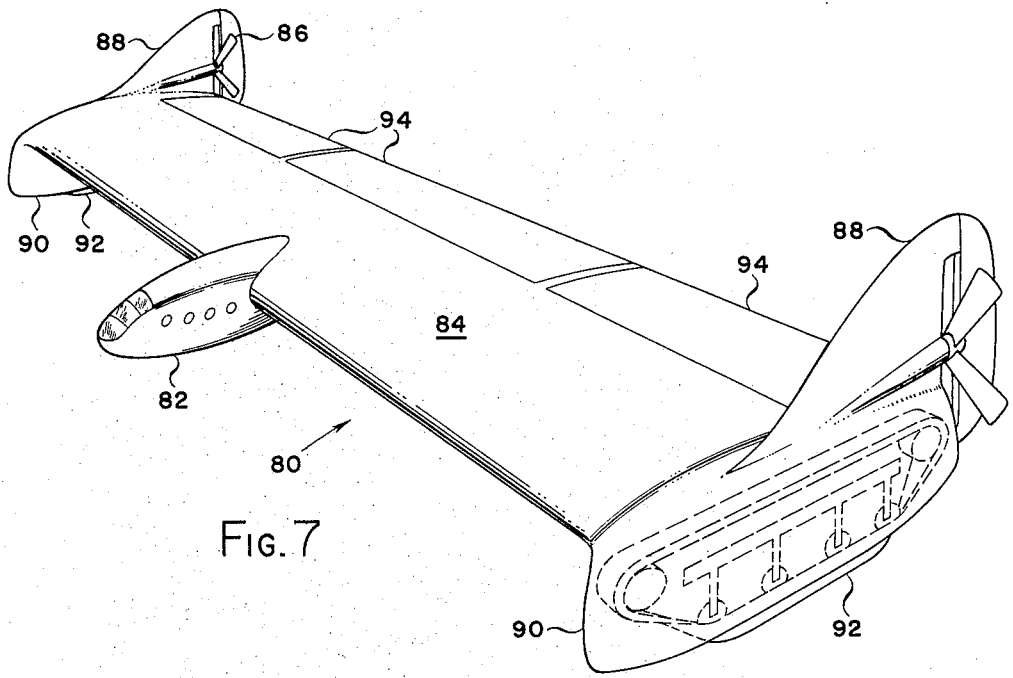
FIGURE 7 is a perspective view of another ground effect machine in accordance with the present invention.

Another application of the endless belt mechanism of the present invention is shown in the winged hull vehicle 80 shown in FIGURE 7. Vehicle 80 is adapted for travel over water and comprises a buoyant hull 82 to which are attached a wing 84, air propellers 86 suitably driven and mounted in tail sections 88, and wing depending pods 90 carrying an endless belt mechanism, generally designated as 92. Belt mechanism 92 is substantially identical in structure and operation as that previously described and therefore will not be further described. Wing flaps 94 may also be provided for additional stability and control of the vehicle.

In operation of vehicle 80, as it gains in forward speed, the lift produced by wing 84 serves to lift hull 82 and pods 90 out of the water. The lift is enhanced by the well-known ground effect encountered by winged vehicles flying close to the base plane. Here, the lift is further enhanced, and at the same time aerodynamic drag is reduced, by pods 90 which channel and confine the airflow, thereby taking maximum advantage of the ground effect. Without such confinement, a certain amount of lift is lost by virtue of the air flowing out beyond the wing tips and a certain amount of induced drag would be created. Forward speed of the vehicle can be adjusted so that the tip of the belt will remain in contact with the water and thereby prevent the air from escaping at the wing tips. As previously mentioned, the tip of the belt in contact with the water is designed to produce a minimum amount of drag or friction loss.

Although particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A ground effect machine for travelling over water, said machine comprising: means for confining air to support said machine above the water, said means including walls extending longitudinally with respect to said machine and being generally out of contact with the water; endless belt means disposed adjacent to said longitudinal walls, said belt means including a generally planar belt with a narrowed edge and a grooved edge, and pulley means fitting into said grooved edge for guiding the belt from a horizontal, flat position out of contact with the water to a vertical, upright position wherein the narrowed edge is in contact with the water for a distance substantially equal to the length of the longitudinal walls, thereby reducing the escape area for the air; and means for driving the belt at substantially the same speed as the machine so as to produce substantially no relative movement of the water-contacting belt portion and the water whereby the frictional losses between the belt and the water are minimized.

2. A ground effect machine for travelling over water, said machine comprising: a plenum chamber having fore and aft transverse walls comprising hinged flaps adapted to maintain light contact with the water generally and to yield to an obstacle in the water and said chamber having longitudinal walls adapted to be generally out of contact with the water; endless belt means disposed adjacent the longitudinal walls, said belt means including a generally planar belt with a narrowed edge and a grooved edge and pulley means fitting into said grooved edge for guiding the belt from a horizontal, flat position out of contact with the water to a vertical, upright position wherein the narrowed edge is in contact with the water for a distance substantially equal to the length of the longitudinal walls; and means for driving the belt at substantially the same speed as the machine so as to produce substantially no relative movement of the water-contacting belt portion and the water whereby the frictional losses between the belt and the water are minimized.

References Cited by the Examiner

UNITED STATES PATENTS

| | | | |
|---|---|---|---|
| 532,221 | 1/1895 | Thomas | 114—67 |
| 1,275,134 | 8/1918 | Colle | 114—67 |
| 1,412,848 | 4/1922 | Dunajeff | 114—66.5 |
| 1,710,869 | 4/1929 | Farrell | 114—66.5 |
| 3,077,174 | 2/1963 | Cockerell | 114—58 X |
| 3,095,938 | 7/1963 | Bertelsen | 180—7 |
| 3,141,436 | 7/1964 | Cathers et al. | 114—66.5 |
| 3,159,361 | 12/1964 | Weiland | 180—7 |
| 3,168,069 | 2/1965 | Everest et al. | 114—67 X |

FOREIGN PATENTS 350,108   6/1931   Great Britain.

OTHER REFERENCES

Mechanical Engineering Publication; page 66, June 1962.

MILTON BUCHLER, *Primary Examiner.*

FERGUS S. MIDDLETON, *Examiner.*

M. A. KLEIN, T. M. BLIX, *Assistant Examiners.*